(12) United States Patent
Hart

(10) Patent No.: US 7,565,916 B2
(45) Date of Patent: Jul. 28, 2009

(54) PNEUMATIC OSCILLATING VALVE AND PNEUMATIC WARNING DEVICE

(75) Inventor: James E. Hart, Trafford, PA (US)

(73) Assignee: Wabtec Holding Corp., Wilmerding, PA (US)

( * ) Notice: Subject to any disclaimer, the term of this patent is extended or adjusted under 35 U.S.C. 154(b) by 633 days.

(21) Appl. No.: 11/330,620

(22) Filed: Jan. 12, 2006

(65) Prior Publication Data

US 2006/0157120 A1    Jul. 20, 2006

Related U.S. Application Data

(60) Provisional application No. 60/643,895, filed on Jan. 14, 2005.

(51) Int. Cl.
*F16K 37/00* (2006.01)
(52) U.S. Cl. ................... 137/557; 251/61.2; 251/118; 116/70
(58) Field of Classification Search ................. 137/557; 251/331, 61.2, 118; 116/70; 128/202.22
See application file for complete search history.

(56) References Cited

U.S. PATENT DOCUMENTS 3,611,981 A * 10/1971 Warncke .................. 116/70
4,176,617 A * 12/1979 Pilipski .................... 116/70

* cited by examiner

*Primary Examiner*—Kevin L Lee
(74) *Attorney, Agent, or Firm*—The Webb Law Firm

(57) ABSTRACT

The pneumatic oscillating valve includes a housing defining an internal chamber, an inlet passageway, and an outlet passageway. An annular seat extends into the internal chamber. A diaphragm is disposed in the internal chamber. The diaphragm seats against the annular seat and separates the inlet passageway from the outlet passageway. A spring engages the diaphragm to seat the diaphragm against the annular seat. As fluid is admitted to the inlet passageway, pressure increases in the inlet passageway until sufficient pressure is present to overcome the spring and unseat the diaphragm. The inlet passageway is more restrictive to fluid flow than the outlet passageway such that fluid is exhausted more quickly from the outlet passageway than can pass through the inlet passageway allowing pressure in the inlet passageway to reduce to a point less than the spring force of the spring thereby allowing the diaphragm to reseat on the seat.

20 Claims, 1 Drawing Sheet

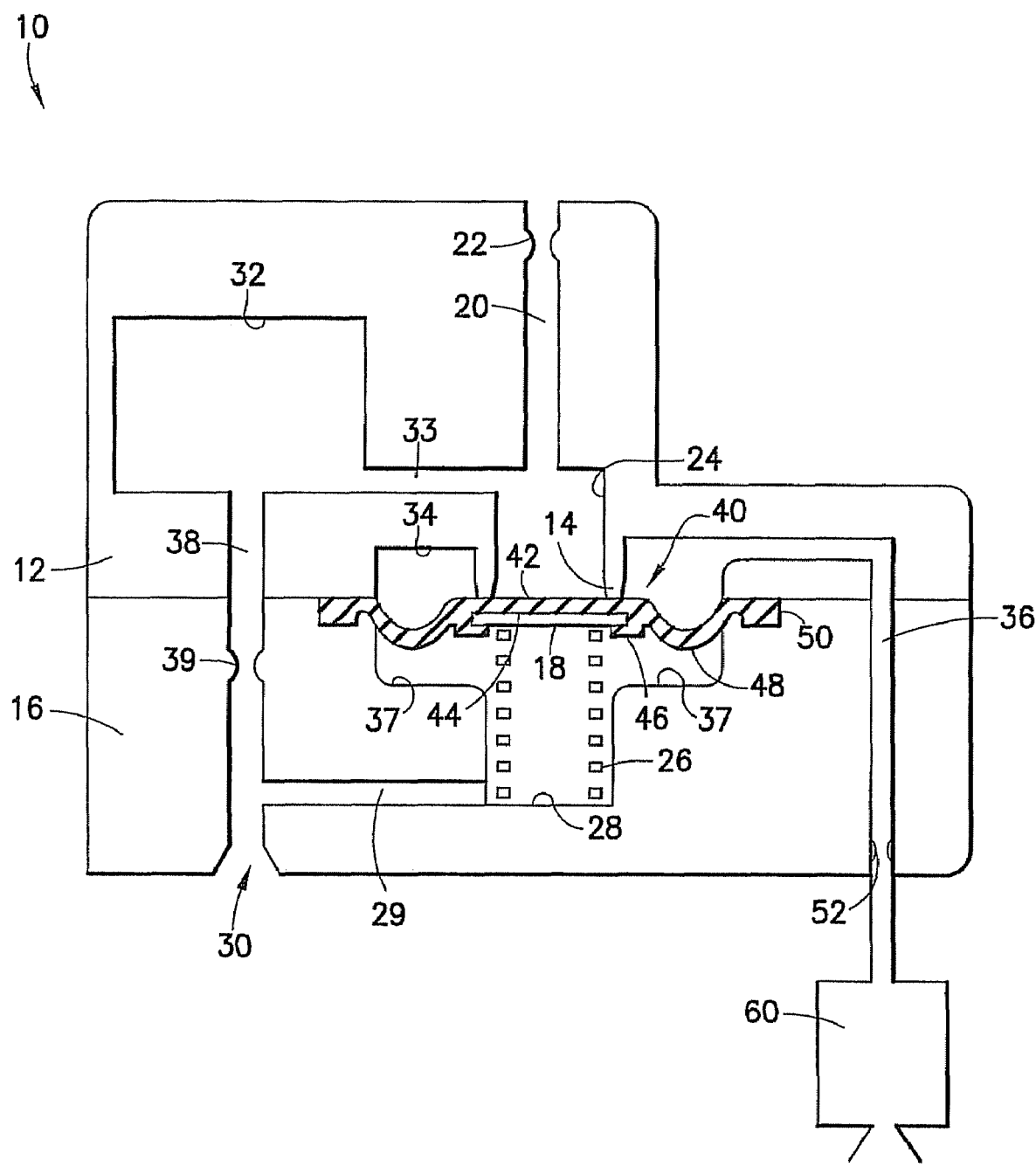

PNEUMATIC OSCILLATING VALVE AND PNEUMATIC WARNING DEVICE

CROSS REFERENCE TO RELATED APPLICATIONS

The present application claims priority to U.S. Application No. 60/643,895 filed Jan. 14, 2005 and entitled "Pneumatic Oscillating Valve", the disclosure of which is incorporated herein in its entirety.

FIELD OF THE INVENTION

The present invention generally relates to the field of pneumatic valves and, more particularly, to a pneumatic oscillating valve that alternately admits and interrupts the flow of fluid under pressure through a port which may be connected to, for example, a pneumatic warning device such as a pneumatic warning horn which serves as an audible caution or warning device.

BACKGROUND OF THE INVENTION

Pneumatic warning horns are common devices found on locomotives or other freight hauling railroad equipment. Supplied by companies such as Wabtec, Inc., locomotives have employed pneumatic warning horns or devices for many years. The majority of these locomotive horns have their air feed controlled by a manual operation performed by a locomotive engineer. However, Wabtec, Inc. has manufactured an automatic pneumatic warning or signaling device for use on a freight locomotive. This automatic device is called a type "C" engine signal valve, and is designed to have the locomotive warning horn emit sound for a similar length of time regardless of the number of cars in a train. The type "C" engine signal valve utilizes two diaphragm assemblies and a stem type valve to control the intermittent rate of operation. This valve is quite complex, making it expensive to manufacture and maintain.

While warning horns are, and signal valves may be, commonplace equipment on locomotives, they are not commonplace on freight cars. Since freight cars have not typically traveled without being connected to a locomotive, freight cars have not previously needed to employ warning devices. However, with the advent of special freight cars carrying pneumatically operated ramps that may be raised and lowered while not connected to a locomotive, warning devices are now needed on such freight cars as well. In this context, the warning device is to inform people to stay clear of the pneumatically operated ramp as it is raised and lowered at the end of the freight car.

SUMMARY OF THE INVENTION

In one aspect, the invention generally features a pneumatic oscillating valve for intermittently allowing and interrupting a flow of a fluid under pressure in a passageway which may be connected to, for example, a pneumatic warning horn. The pneumatic oscillating valve comprises a housing defining an internal chamber, an inlet passageway, and an outlet passageway which may also be referred to as a primary exhaust passageway. The inlet passageway is generally adapted for connection to a supply of fluid under pressure. The inlet passageway and outlet passageway serve as an inlet and an outlet for fluid flow to and from the internal chamber. The pneumatic oscillating valve further comprises an annular seat typically extending into the internal chamber at a perimeter of the inlet passageway, and a diaphragm, typically having a generally stiffened or reinforced center portion, disposed in the internal chamber. The diaphragm generally comprises a sealing portion adapted to seat against the annular seat and separate the inlet passageway from fluid communication with the outlet passageway. Additionally, the pneumatic oscillating valve comprises a biasing spring typically engaging the diaphragm to seat the diaphragm sealing portion against the annular seat. Generally, in operation, as fluid is admitted to the inlet passageway from the fluid supply source pressure increases in the inlet passageway until sufficient pressure is present on the diaphragm sealing portion to overcome the biasing spring and unseat the diaphragm sealing portion from the annular seat. This unseating generally increases the effective area of the diaphragm on which the pressure may act. The inlet passageway is more restrictive to fluid flow than the outlet passageway. As a result, fluid is exhausted more quickly from the outlet passageway than can pass through the inlet passageway, thus allowing pressure in the valve to reduce to a point where the pressure acting on the diaphragm, typically the full expanded area of the diaphragm, is less than the spring force of the biasing spring thereby allowing the diaphragm to reseat on the annular seat. The pneumatic oscillating valve, in general accordance with the foregoing, may operate to cyclically admit and interrupt fluid flow from the inlet passageway to the outlet passageway.

The outlet passageway may be connected to a fluid flow restriction device. Additionally, flow restrictions may be provided or defined in the inlet passageway and outlet passageway. A stabilizing volume chamber, for example, disposed in the housing, may be in fluid communication with the inlet passageway. The housing may define an exhaust passageway, for example, an auxiliary exhaust passageway, in fluid communication with the inlet passageway. The exhaust passageway may be in fluid communication with the inlet passageway downstream of a flow restriction in the inlet passageway. A flow restriction may be provided or defined in the exhaust passageway. The diaphragm sealing portion is typically stiffened and the biasing spring may engage the diaphragm sealing portion to seat the diaphragm sealing portion against the annular seat.

As indicated, the pneumatic oscillating valve may be coupled with a pneumatic warning horn. Accordingly, another aspect of the invention features a pneumatic warning system or device comprising the pneumatic oscillating valve described hereinabove and a pneumatic warning horn. The pneumatic warning device includes a housing defining an internal chamber, an inlet passageway, and an outlet passageway which may also be referred to as a primary exhaust passageway. The inlet passageway is generally adapted for connection to a supply of fluid under pressure. The inlet passageway and outlet passageway serve as an inlet and an outlet for fluid to and from the internal chamber. The pneumatic oscillating valve further comprises an annular seat typically extending into the internal chamber at a perimeter of the inlet passageway, and a diaphragm, typically having a generally stiffened or reinforced center portion, disposed in the internal chamber. The diaphragm generally comprises a sealing portion adapted to seat against the annular seat and separate the inlet passageway from fluid communication with the outlet passageway. Additionally, the pneumatic oscillating valve comprises a biasing spring typically engaging the diaphragm to seat the diaphragm sealing portion against the annular seat. Generally, in operation, as fluid is admitted to the inlet passageway from the fluid supply source pressure increases in the inlet passageway until sufficient pressure is present on the diaphragm sealing portion to overcome the biasing spring and unseat the diaphragm sealing portion from the annular seat. This unseating generally increases the effective area of the diaphragm on which the pressure may act. The inlet passageway is more restrictive to fluid flow than the outlet passageway and pneumatic warning horn. As a result, fluid is exhausted more quickly from the outlet passageway and pneumatic warning horn than can pass through the inlet passageway, thus allowing pressure in the valve to reduce to a point where the pressure acting on the diaphragm, typically the full expanded area of the diaphragm, is less than the spring force of the biasing spring thereby allowing the diaphragm to reseat on the annular seat. The pneumatic oscillating valve, in general accordance with the foregoing, may operate to cyclically admit and interrupt fluid flow from the inlet passageway to the outlet passageway.

In the pneumatic warning device, flow restrictions may be provided or defined in the inlet passageway and outlet passageway. A stabilizing volume chamber, for example, disposed in the housing, may be in fluid communication with the inlet passageway. The housing may define an exhaust passageway in fluid communication with the inlet passageway. The exhaust passageway may be in fluid communication with the inlet passageway downstream of a flow restriction in the in the inlet passageway. A flow restriction may be provided or defined in the exhaust passageway. The diaphragm sealing portion is typically stiffened and the biasing spring may engage the diaphragm sealing portion to seat the diaphragm sealing portion against the annular seat.

A still further aspect of the invention relates to a method of operating the pneumatic warning device to emit an audible warning signal. The method generally comprises admitting fluid from the fluid supple source into the inlet passageway until sufficient pressure is present on the diaphragm sealing portion to overcome the biasing spring and unseat the diaphragm sealing portion from the annular seat, thereby allowing the fluid to pass to the outlet passageway and actuate the pneumatic warning horn. As indicated, the inlet passageway is more restrictive to fluid flow than the outlet passageway and pneumatic warning horn such that fluid is exhausted more quickly from the outlet passageway and pneumatic warning horn than can pass through the inlet passageway, thus allowing pressure in the valve to reduce to a point where the pressure acting on the diaphragm is less than the spring force of the biasing spring thereby allowing the diaphragm to reseat on the annular seat. Upon the diaphragm unseating from the annular seat, a greater surface area of the diaphragm is exposed to the fluid than when the diaphragm is seated on the annular seat, thus causing the diaphragm to be unseated at a higher pressure than it can be reseated. The pneumatic oscillating valve generally operates to cyclically admit and interrupt fluid flow from the inlet passageway.

Further details and advantages of the invention will become clear upon reading the following detailed description in conjunction with the accompanying drawing figure.

BRIEF DESCRIPTION OF THE DRAWING

The FIGURE is a diagrammatic view of a pneumatic oscillating valve for intermittently allowing and interrupting a flow of a fluid under pressure in a passageway connected, for example, to a pneumatic warning horn.

DETAILED DESCRIPTION OF THE PREFERRED EMBODIMENT

For purposes of the description hereinafter, spatial orientation terms, if used, shall relate to an embodiment of the invention as it is oriented in the accompanying drawing figure or otherwise described in the following description of the invention. However, it is to be understood that the embodiment described hereinafter may assume many alternative variations and embodiments. It is also to be understood that the specific devices illustrated in the accompanying drawing figure and described herein are simply exemplary to the invention and should not be considered as limiting.

The present invention is described hereinafter with reference to the accompanying FIGURE, wherein a pneumatic oscillating valve 10 for intermittently allowing and interrupting a flow of a fluid under pressure in a passageway is generally shown. Valve 10 generally comprises a first housing portion or section 12 defining a beaded annular seat 14, and a second housing portion or section 16 that is engageable with the first housing portion 12 to generally form the overall structure and shape of valve 10. A diaphragm 40 for providing a fluid seal is engagably clamped at its outer periphery between the first housing portion 12 and the second housing portion 16, as discussed further herein. The first and second housing portions 12, 16 may also be formed as a unitary housing structure rather than the two-piece structure illustrated in the FIGURE or, further, as a multi-piece structure. The diaphragm 40 generally comprises a stiffened center area or portion for forming a fluid seal within valve 10.

Diaphragm 40 is engageable at a generally centrally-located, generally flat, and generally circular sealing surface or portion 42 with the annular seat 14. The diaphragm 40 may be made from an elastomer, plastic, or Teflon®, and is desirably formed from an elastomer. The elastomer may be a natural rubber, a synthetic rubber, or a combination thereof, and the elastomeric diaphragm 40 is optionally reinforced by a flexible fabric (not shown). Generally, at least a portion of the diaphragm 40 is resiliently flexible, as described herein. The diaphragm 40 may be reinforced by a stiffening insert 18 which is disposed centrally on a surface or portion 44 of diaphragm 40 axially opposed to the centrally-located top sealing surface or portion 42 of the diaphragm 40. The stiffening inset 18 is held in place by a depending annular ring portion 46 of diaphragm 40. The insert 18 may be made of metal, elastomer, plastic, or Teflon®, and is desirably made from metal such as brass. The diaphragm 40 further comprises a flexible portion 48 that circumscribes or surrounds sealing surface or portion 42 and a peripheral clamping band or bead 50 that is captured between the first housing portion 12 and the second housing portion 16 to secure diaphragm 40 in place between these components. The flexible portion 48 is generally flexibly resilient and accommodates movement at the outer periphery of the generally rigid central portion 42, 44 of diaphragm 40 which is optionally reinforced with insert 18. Diaphragm 40 may be either injection or compression molded of, for example, elastomer-coated fabric, which allows flexibility but limited planar stretchability. Insert 18 may molded in place with the body of the diaphragm 40.

The first housing portion 12 defines a first or inlet passageway or port 20 having a predetermined cross-sectional configuration. The first or inlet passageway 20 connects valve 10 to a supply (not shown) of energizing fluid, typically compressed air. As an example, the energizing fluid source may be compressed air from a large reservoir on a freight car used to operate a ramp carried on the freight car. The compressed air may be exhausted from one side of two-way pneumatic cylinders used to effectuate ramp movements, and this source may be used as the fluid supply source for valve 10 and be connected to the first passageway 20. The exhausted air from this source ideally provides an energy source at just the right time to operate valve 10 and any pneumatic warning horn typically coupled thereto, as described further herein. However, other sources of energizing fluid may also be used as the fluid supply source for valve 10, and valve 10 may also be used to drive other downstream devices other than a pneumatic warning horn.

The first passageway 20 contains or defines an optional flow restriction 22 of a predetermined size. A first chamber or area 24 is fluidly connected to the first passageway 20 and is defined within the first housing portion 12. The first or inlet chamber 24 may be considered to be part of the overall fluid inlet path for valve 10 and, thus, may be considered to be part of the first passageway 20. The first chamber 24 is located upstream of diaphragm 40 in the assembled valve 10. The first chamber 24 allows fluid from the fluid supply source (not shown) and under pressure to bias the diaphragm 40 in a disengaging downward direction from the annular seat 14 in the orientation shown in FIG. 1. At least a portion of the first chamber 24 is defined by an inner side or surface of the annular seat 14 defined by the first housing portion 12 and, further, at least a portion of the centrally-located sealing "top" surface or portion 42 of diaphragm 40. The annular sea 14 extends downward from a perimeter of the first chamber 24 and, thus, the first passageway 20.

A biasing spring 26 for biasing the diaphragm 40 in an engaging direction toward the annular seat 14 is caged or received within a second chamber or area 28 defined by the second housing portion 16. The biasing spring 26 is disposed to act between the diaphragm insert 18 and the second housing portion 16 in the second chamber 28. In a preferred form, the biasing spring 26 is a coil spring. The second chamber 28 is disposed or defined within the second housing portion 16 and is in fluid communication via a branch conduit 29 with a discharge passageway or port 30 to atmospheric pressure. The second chamber 28 has at least a portion thereof bounded by the bottom side or surface of diaphragm 40.

A third chamber or area 32 is defined within the first housing portion 12 and is desirably in fluid communication with the first chamber 24 via a branch conduit 33. The third chamber 32 is adapted to hold a set volume of fluid under pressure which is used to bias the diaphragm 40 in the disengaging direction away from the annular seat 14 for a predetermined time during operation of valve 10 as described further herein. Accordingly, the third chamber 32 may be described as a stabilizing or holding volume chamber. It is possible for the stabilizing volume or third chamber 32 to be located external to valve 10.

A fourth chamber 34 is generally defined within the first housing portion 12. The fourth chamber 34 has at least a portion thereof bounded by an outer side or surface of the annular seat 14 and by a top side or surface of diaphragm 40, typically the flexible "annular" portion 48 of diaphragm 40 in the closed or seated position of diaphragm 40. The fourth chamber 34 increases the effective area of diaphragm 40 exposed to fluid under pressure when diaphragm 40 is disengaged from the annular seat 14, and allows fluid under pressure to travel from the first chamber 24 to a second or outlet passageway or port 36 of valve 10 when the diaphragm 40 is disengaged or unseated from annular seat 14. As will be clear from viewing the FIGURE, the fourth chamber 34 becomes fluidly connected to the second or outlet passageway 36 when the diaphragm 40 is disengaged or unseated from the annular seat 14, thereby supplying fluid under pressure to a downstream device 60 connected to the second or outlet passageway 36 as discussed further herein. The downstream device 60 may be a pneumatic warning horn or similar device and the coupling of valve 10 and device 60 provides a pneumatic warning system or device that may be used, for example, on locomotives or freight cars to provide audible warning signals at a regular or standardized intermittent rate. Such audible signals may be used to warn persons near a freight car, for example, that a pneumatically operated ramp carried on the freight car is in operation.

Additionally, as shown in the FIGURE, a central area or portion of the second chamber 28 is used to receive and cage the biasing spring 26 and defines a shape generally corresponding to the biasing spring 26 (e.g., cylindrical). Further, this central area or portion of the second chamber 28 is generally formed opposite of the first or inlet chamber 24 and with a similar configuration as the first chamber 24. The second chamber 28 desirably further comprises or defines a lateral or extended portion or area 37 which mimics the general shape and configuration of the opposing fourth chamber 34. The lateral portion 37 of the second chamber 28 is sized to accommodate any expansion of the flexible portion 48 of diaphragm 40 and the overall disengaging downward movement of the diaphragm 40 during operation of valve 10. The fourth chamber 34 and the second chamber 28 including lateral portion 37 together generally define a main internal chamber within valve 10 for accommodating diaphragm 40 and may be referred to collectively as an internal chamber or diaphragm chamber in this disclosure. As a result, the first or inlet passageway 20 and the first or inlet chamber 24 generally form the inlet to the internal/diaphragm chamber and the second or outlet passageway 36 defines or forms the outlet from the internal/diaphragm chamber. The enclosed diaphragm 40 generally divides or separates the internal/diaphragm chamber into two chamber portions or areas, generally corresponding to the fourth (e.g., upper) chamber 34 and the second chamber 28 including lateral portion 37 (e.g., lower) chamber, respectively.

As indicated, the second or outlet passageway 36 fluidly connects the fourth chamber 34 to the downstream device 60 when diaphragm 40 is disengaged or unseated from the annular seat 14. Specifically, device 60 is in fluid communication with the first or inlet passageway 20 and first or inlet chamber 24 when the diaphragm 40 is biased in the disengaging direction and lifted from engagement with annular seat 14 by an increase in fluid pressure in the first or inlet passageway 20, first or inlet chamber 24 and, the stabilizing volume or third chamber 32. In the illustrated embodiment of valve 10, the device 60 is a pneumatic warning horn. The device 60, or pneumatic warning horn, typically contains one or more flow restrictions (not shown) of a predetermined size such that fluid, typically air, passing through device 60 under pressure causes the device 60 to emit an audible sound, typically a warning sound. The optional flow restriction 22 in the first passageway 20 is more restrictive than the flow restriction(s) (not shown) in the device 60. In order for proper operation of valve 10 as described in the foregoing paragraphs, the flow capacity in the first or inlet passageway 20 (including the first or inlet chamber 24) is less than the flow capacity of the device 60 and/or the flow capacity of the second or outlet passageway 36.

Valve 10 optionally comprises a third passageway or port 38 branching from the first or inlet passageway 20 downstream of flow restriction 22 for allowing excess or surplus fluid from the fluid supply source (not shown), and not required for operation of valve 10, to exhaust to the atmosphere. The third passageway 38 is typically formed or defined in the first housing portion 12 and, as indicated, branches from the first or inlet passageway 20 to connect the first or inlet passageway 20 to the atmosphere. Thus, the third passageway 38 may be referred to as an auxiliary exhaust passageway due to its location and general function in valve 10, as opposed to the "primary" exhaust passageway defined by the second or outlet passageway 36 and device 60. The third passageway 38 optionally contains or defines a flow restriction 39 of a predetermined size which may be more restrictive than the flow restriction 22 in the first passageway 20 depending on the volumetric fluid flow into the first or inlet passageway 20 from the fluid supply source (not shown). As indicated previously, the flow restriction 22 in the first or inlet passageway is more restrictive than the flow restriction(s) (not shown) in the device 60 and/or in the second or outlet passageway 36. Accordingly, the optional flow restriction 39 in the third passageway 38, on some occasions depending on the fluid flow rate into the first or inlet passageway from the fluid supply source (not shown) may be more restrictive to fluid flow than the flow restriction 22 in the first or inlet passageway 20 and the flow restriction(s) (not shown) in the device 60 and/or in the second or outlet passageway 36.

In operation, fluid, typically compressed air from the fluid supply source (not shown), is admitted into valve 10 via the first or inlet passageway 20. Excess or surplus air not required for operation of the device 60 downstream of valve 10 is exhausted through the third or auxiliary exhaust passageway 38. The air flow passes through flow restriction 22 in the first or inlet passageway 20 and into the stabilizing volume chamber or third chamber 32. The pressurizing air acts on the top side or surface of the diaphragm 40 and, specifically, on the central sealing portion 42 of the diaphragm 40 within the confines of the annular seat 14. As pressure builds within the first or inlet passageway 20, first or inlet chamber 24, and the stabilizing volume chamber or third chamber 32, this increasing pressure ultimately produces a force acting on the diaphragm 40 sufficient to lift the diaphragm 40 from the annular seat 14 against the spring force of the biasing spring 26. For example, when the pressure reaches 30 psi, sufficient lifting force is applied to the diaphragm 40 to unseat the diaphragm 40 from annular seat 14. Once the diaphragm 40 is unseated from the annular seat 14, air will immediately flow past the opened diaphragm 40, expand into the fourth chamber 34, and flow into the second or outlet passageway 36, and flow, ultimately, to the device 60 (e.g., pneumatic warning horn). The device 60, typically a pneumatic warning horn, contains internal flow restrictions that create sound as the air passes therethrough, as indicated previously.

When the diaphragm 40 unseats from the annular seat 14, the air under pressure from the stability volume defined by the first or inlet passageway 20, first or inlet chamber 24, and stabilizing volume chamber or third chamber 32, is suddenly admitted to the fourth chamber 34 outside the annular seat 14, thus increasing the total effective area of pressure serving to force and hold the diaphragm 40 unseated from annular seat 14. As indicated, with the diaphragm 40 unseated from the annular seat 14, the pressure is also admitted to the second or outlet passageway 36 and, further, device 60. As the flow restriction 22 in the first or inlet passageway 20 is more restrictive to flow than the second or outlet passageway 36 and/or the encountered device 60, the previously-existing uniform pressure throughout valve 10 will gradually decrease as air exits to the atmosphere faster than it may be re-supplied to the first or inlet passageway 20. This pressure will, in fact, decrease well below the opening pressure required to open or unseat the diaphragm 40 before allowing the diaphragm 40 to reseat because the effective area of pressure holding the diaphragm 40 open against the biasing spring 26 is substantially greater than the area defined or constrained within the annular seat 14 (e.g., the sealing portion 42) which determines the opening pressure. When the pressure drops sufficiently, for example, to about 10 psi, that even with the expanded effective area it no longer produces sufficient force to overcome the biasing spring 26, the diaphragm 40 will reseat on the annular seat 14. Therefore, a ratio of the area of the diaphragm 40 defined or constrained inside the annular seat 14 (e.g., sealing portion 42) to the entire effective "top" area of the diaphragm 40 determines the specific difference between the opening and closing pressures of valve 10.

When the diaphragm 40 reseats, the second or outlet passageway 36 and device 60 quickly exhaust, since air from the first or inlet passageway 20 will be cut-off, and the pneumatic warning horn comprising one embodiment of the downstream device 60 will stop sounding. Also, pressure within the first or inlet passageway, first or inlet chamber 24, and stabilizing volume or third chamber 32 will again begin to build because they are cut-off from exhaust by the seated diaphragm 40. This pressure buildup and exhaust cycle, which desirably intermittently operates an audible warning device as indicated previously, will be repeated as long as the compressed air source provides sufficient pressure to continue to re-open the diaphragm 40 from annular seat 14.

The frequency and duration of the intermittent cycle is controlled primarily by the sizing of the optional inlet flow restriction 22 relative to the exhaust restriction of the particular downstream device 60 (e.g., pneumatic warning horn) that is used, as well as the size of the stabilizing volume or third chamber 32. However, these two specific methods for changing the frequency and duration of the intermittent cycle of valve 10 may also be affected somewhat by the flow restriction 39 in the auxiliary exhaust passageway 38 and the given volumetric flow coming from the fluid supply source (not shown). With a controllable volumetric flow of supply pressure to the first or inlet passageway 20 of valve 10, where such supply is not specifically dependant on the needs of, for example, a ramp operation, the auxiliary exhaust passageway 38 may be eliminated if desired.

Finally, as indicated previously, flow restriction 22 is optional in the first passageway 20. The first or inlet passageway 20 may itself be formed to restrict the air flow to a desired or set amount in place of flow restriction 22. Thus, the first or inlet passageway 20 is generally more restrictive to fluid flow than the discharge fluid flow permitted by device 60. Moreover, the second or outlet passageway 36 may itself be used to restrict fluid outflow, for example, by including an optional flow restriction 52 in the outlet passageway 36, particularly to suit the fluid flow needs for operation of the device 60. However, the second or outlet passageway 36 with flow restriction 52 is less restrictive to fluid flow than the first passageway 20. Again, the second or outlet passageway 36 may itself be formed to restrict air outflow to a desired or set amount in place of flow restriction 52. Moreover, the second or outlet passageway 36 may be used in place of device 60, for example, by configuring the outlet passageway 36 as a pneumatic warning horn with internal restrictions.

While the present invention was described by way of a detailed description of a preferred embodiment of a pneumatic oscillating valve and a pneumatic warning device including the same, those skilled in the art may make modifications and alterations to this invention without departing from the scope and spirit of the invention. Accordingly, the foregoing description is intended to be illustrative rather than restrictive. The invention described hereinabove is defined by the appended claims, and all changes to the invention that fall within the meaning and the range of equivalency of the claims are embraced within their scope.

What is claimed is:

1. A pneumatic oscillating valve comprising:
    a housing defining an internal chamber and comprising:

an inlet passageway adapted for connection to a supply source of fluid under pressure; and an outlet passageway, the inlet and outlet passageways serving as an inlet and an outlet for fluid flow to and from the internal chamber;

an annular seat extending into the internal chamber at a perimeter of the inlet passageway;

a diaphragm disposed in the internal chamber and comprising a sealing portion adapted to seat against the annular seat and separate the inlet passageway from fluid communication with the outlet passageway; and a biasing spring engaging the diaphragm to seat the diaphragm sealing portion against the annular seat;

wherein the inlet passageway is more restrictive to fluid flow than the outlet passageway enabling the pneumatic oscillating valve to cyclically admit and interrupt fluid flow from the inlet passageway to the outlet passageway, and wherein the housing defines an exhaust passageway in fluid communication with the inlet passageway and the exhaust passage comprising a flow restriction.

2. A pneumatic oscillating valve as claimed in claim 1, wherein the outlet passageway is connected to a fluid flow restriction device.

3. A pneumatic oscillating valve as claimed in claim 1, comprising a flow restriction in the inlet passageway.

4. A pneumatic oscillating valve as claimed in claim 1, comprising a flow restriction in the outlet passageway.

5. A pneumatic oscillating valve as claimed in claim 1, comprising a stabilizing volume chamber in fluid communication with the inlet passageway.

6. A pneumatic oscillating valve as claimed in claim 5, wherein the stabilizing volume chamber is disposed within the housing.

7. A pneumatic oscillating valve as claimed in claim 1, comprising a flow restriction in at least one of the inlet passageway and the outlet passageway.

8. A pneumatic oscillating valve comprising:
a housing defining an internal chamber and comprising:
an inlet passageway adapted for connection to a supply source of fluid under pressure; and
an outlet passageway, the inlet and outlet passageways serving as an inlet and an outlet for fluid flow to and from the internal chamber;
an annular seat extending into the internal chamber at a perimeter of the inlet passageway;
a diaphragm disposed in the internal chamber and comprising a sealing portion adapted to seat against the annular seat and separate the inlet passageway from fluid communication with the outlet passageway; and
a biasing spring engaging the diaphragm to seat the diaphragm sealing portion against the annular seat; and
wherein the housing defines an exhaust passageway in fluid communication with the inlet passageway.

9. A pneumatic oscillating valve as claimed in claim 8, wherein the exhaust passageway is in fluid communication with the inlet passageway downstream of a flow restriction in the inlet passageway.

10. A pneumatic oscillating valve as claimed in claim 1, wherein the diaphragm sealing portion is stiffened and the biasing spring engages the diaphragm sealing portion to Seat the diaphragm sealing portion against the annular seat.

11. A pneumatic warning device, comprising:
a housing defining an internal chamber and comprising:
an inlet passageway adapted for connection to a supply source of fluid under pressure; and
an outlet passageway, the inlet and outlet passageways serving as an inlet and an outlet for fluid flow to and from the internal chamber;
an annular seat extending into the internal chamber at a perimeter of the inlet passageway;
a diaphragm disposed in the internal chamber and comprising a sealing portion adapted to seat against the annular seat and separate the inlet passageway from fluid communication with the outlet passageway;
a biasing spring engaging the diaphragm to seat the diaphragm sealing portion against the annular seat; and
a pneumatic warning horn connected to the outlet passageway;
wherein the inlet passageway is more restrictive to fluid flow than the outlet passageway and pneumatic warning horn enabling the pneumatic oscillating valve to cyclically admit and interrupt fluid flow from the inlet passageway to the outlet passageway and pneumatic warning horn, and wherein the housing defines an exhaust passageway in fluid communication with the inlet passageway and the exhaust passage comprising a flow restriction.

12. A pneumatic warning device as claimed in claim 11, comprising a flow restriction in the inlet passageway.

13. A pneumatic warning device as claimed in claim 11, comprising a flow restriction in the outlet passageway.

14. A pneumatic warning device as claimed in claim 11, comprising a stabilizing volume chamber in fluid communication with the inlet passageway.

15. A pneumatic warning device as claimed in claim 14, wherein the stabilizing volume chamber is disposed within the housing.

16. A pneumatic warning device as claimed in claim 11, wherein the diaphragm sealing portion is stiffened and the biasing spring engages the diaphragm sealing portion to seat the diaphragm sealing portion against the annular seat.

17. A pneumatic warning device as claimed in claim 11, comprising a flow restriction in at least one of the inlet passageway and the outlet passageway.

18. A pneumatic warning device, comprising:
a housing defining an internal chamber and comprising:
an inlet passageway adapted for connection to a supply source of fluid under pressure; and
an outlet passageway, the inlet and outlet passageways serving as an inlet and an outlet for fluid flow to and from the internal chamber;
an annular seat extending into the internal chamber at a perimeter of the inlet passageway:
a diaphragm disposed in the internal chamber and comprising a sealing portion adapted to seat against the annular seat and separate the inlet passageway from fluid communication with the outlet passageway; and
a biasing spring engaging the diaphragm to seat the diaphragm sealing portion against the annular seat; and
wherein the housing defines an exhaust passageway in fluid communication with the inlet passageway.

19. A pneumatic warning device as claimed in claim 18, wherein the exhaust passageway is in fluid communication with the inlet passageway downstream of a flow restriction in the inlet passageway.

20. A method of operating a pneumatic warning device to emit an audible warning signal, comprising:
providing a pneumatic warning device, comprising:
a housing defining an internal chamber and comprising:
an inlet passageway adapted for connection to a supply source of fluid under pressure; and an outlet passageway, the inlet and outlet passageways serving as an inlet and an outlet for fluid flow to and from the internal chamber;

an annular seat extending into the internal chamber at a perimeter of the inlet passageway;

a diaphragm disposed in the internal chamber and comprising a sealing portion adapted to seat against the annular seat and separate the inlet passageway from fluid communication with the outlet passageway;

a biasing spring engaging the diaphragm to seat the diaphragm sealing portion against the annular seat; and a pneumatic warning horn connected to the outlet passageway; and admitting fluid from the fluid supply source into the inlet passageway until sufficient pressure is present on the diaphragm sealing portion to overcome the biasing spring and unseat the diaphragm sealing portion from the annular seat, thereby allowing the fluid to pass to the outlet passageway and actuate the pneumatic warning horn;

wherein the inlet passageway is more restrictive to fluid flow than the outlet passageway and pneumatic warning horn enabling the pneumatic oscillating valve to cyclically admit and interrupt fluid flow from the inlet passageway to the outlet passageway and pneumatic warning horn, and wherein the housing defines an exhaust passageway in fluid communication with the inlet passageway and the exhaust passage comprising a flow restriction.

* * * * *